(12) United States Patent
Collas et al.

(10) Patent No.: US 6,334,888 B1
(45) Date of Patent: Jan. 1, 2002

(54) BOWL LID FOR COOKING APPLIANCE

(75) Inventors: Guy Collas, Ifs; Jean Lereverend, Caen, both of (FR)

(73) Assignee: Laboratories Serobiologiques (Societe Anonyme), Pulnoy (FR)

( * ) Notice: Subject to any disclaimer, the term of this patent is extended or adjusted under 35 U.S.C. 154(b) by 0 days.

(21) Appl. No.: 09/486,075
(22) PCT Filed: Aug. 19, 1998
(86) PCT No.: PCT/FR98/01822
 § 371 Date: Feb. 22, 2000
 § 102(e) Date: Feb. 22, 2000
(87) PCT Pub. No.: WO99/08581
 PCT Pub. Date: Feb. 25, 1999

(30) Foreign Application Priority Data

Aug. 20, 1997 (FR) .................................................. 97 10734

(51) Int. Cl.$^7$ ....................................................... A47J 36/06
(52) U.S. Cl. ................................. 96/148; 55/385.4; 55/494
(58) Field of Search ................... 96/147, 148; 55/385.4, 55/494, 512, 515, 516; 99/352, 357; 220/912, 371; 312/31.1

(56) References Cited

U.S. PATENT DOCUMENTS

| 1,794,940 A | * | 3/1931 | Zimmerman |
| 1,942,900 A | * | 1/1934 | Peters |
| 4,487,117 A | * | 12/1984 | Colley et al. .................... 99/403 |
| 5,029,519 A | * | 7/1991 | Boyen ............................. 99/403 |
| 5,230,722 A | * | 7/1993 | Yonkers .......................... 55/337 |
| 5,236,478 A | * | 8/1993 | Lewis et al. .................... 55/319 |
| 5,300,139 A | * | 4/1994 | Lin ................................. 96/135 |

FOREIGN PATENT DOCUMENTS

| BE | 870418 A | * | 3/1979 |
| DE | 8006417 U | * | 6/1980 |
| EP | 0215768 A1 | * | 9/1986 |
| EP | 0527418 A1 | * | 2/1993 |
| EP | 1029490 A1 | * | 8/2000 |
| SE | 9504383 A | * | 7/1997 |

* cited by examiner

Primary Examiner—Duane Smith
Assistant Examiner—Frank M. Lawrence
(74) Attorney, Agent, or Firm—Young & Thompson

(57) ABSTRACT

A lid with a housing suited for receiving a filter for absorbing odors and fats given off during cooking, and having inlets and outlets communicating externally, the housing has an opening emerging on the side of the lid, and the filter is mounted retractable and sealed through said opening.

12 Claims, 2 Drawing Sheets

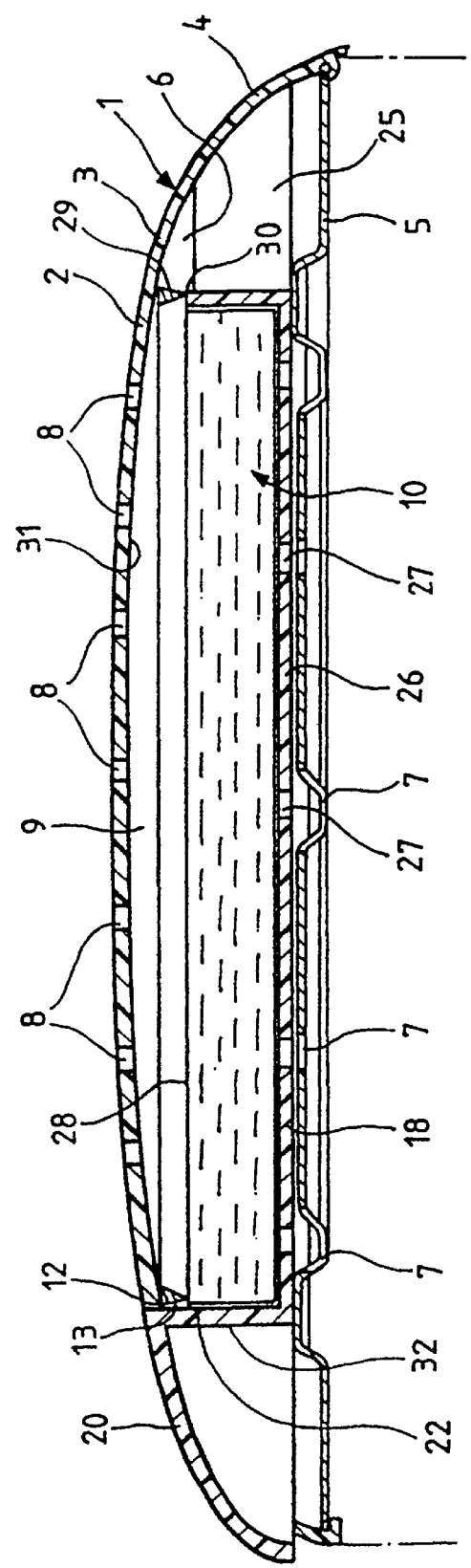
FIG_1

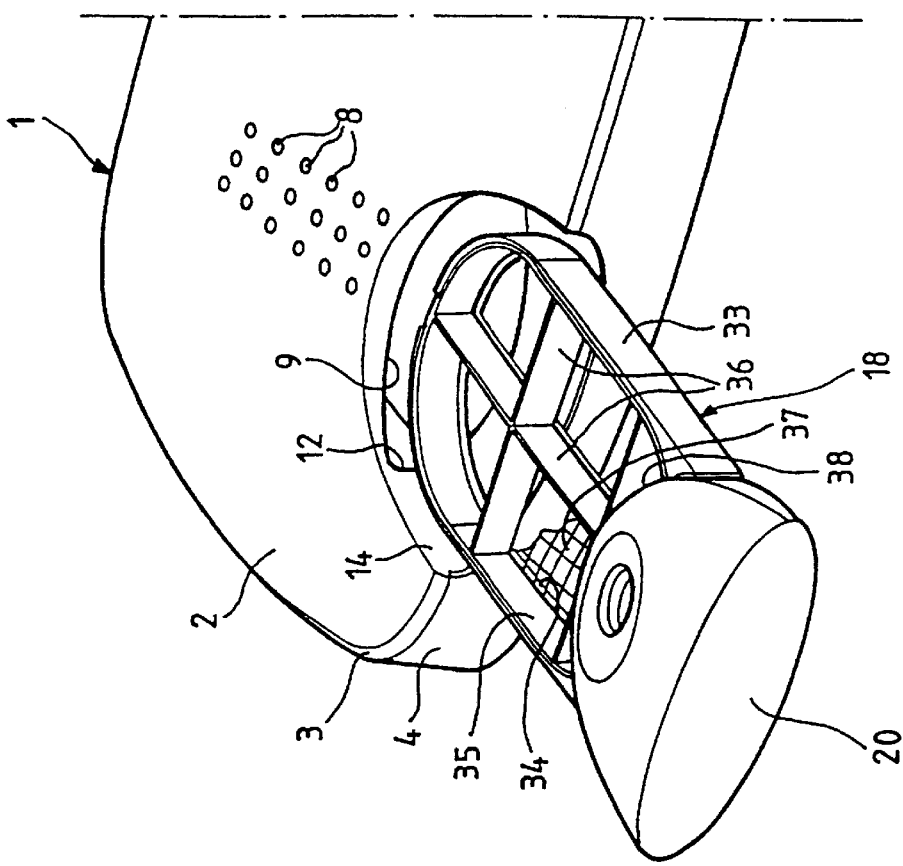
FIG_3
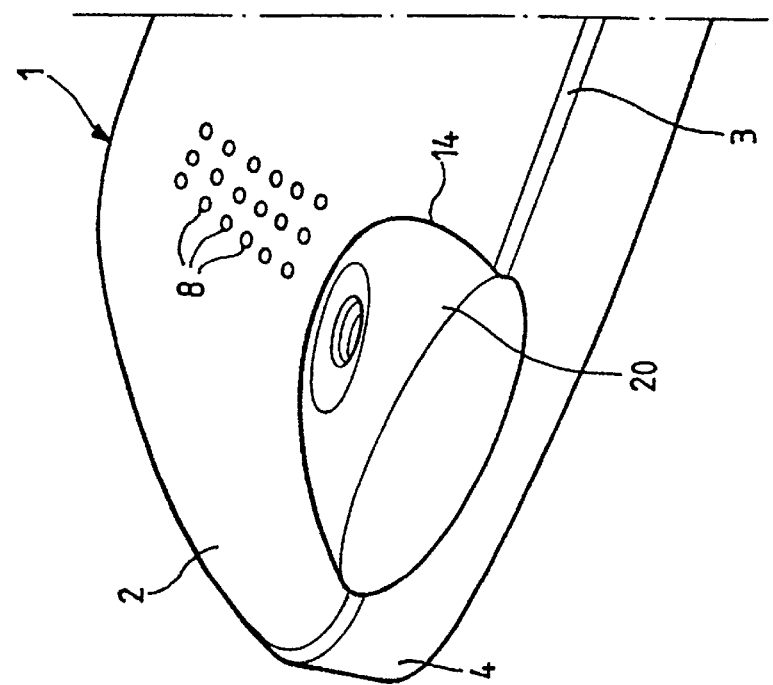
FIG_2

BOWL LID FOR COOKING APPLIANCE

This application is a 371 of PCT Application No. PCT/FR98/01822, filed on Aug. 19, 1998.

BACKGROUND OF THE INVENTION

The present invention relates to the covers of bowls of cooking apparatus having a recess which is adapted to receive a filter suitable to absorb odors and greases emitted in the course of cooking, and which has inlet openings as well as escape openings communicating with the outside.

DESCRIPTION OF THE RELATED ART

In most of the covers of existing apparatus on the market, the recess is formed by a hollow provided in the upper wall of the cover enclosed by a trap having escape openings. However, such an embodiment must satisfy not only aesthetic requirements requiring a trap-recess assembly without play and if possible such that the trap will be flush with the surface of the upper wall of the cover, but also, high thermal requirements due to the superheated steam passing upwardly through the filter and the recess; which requirements are antithetical to aesthetic requirements.

The manufacturer must thus make a compromise and design a particular assembly with a lock that takes up play whilst preserving easy disassembly to permit changing the used filters. Such an embodiment is thus costly and also requires, during production of the apparatus, painstaking manual assembly operations, inconsistent with mass production.

SUMMARY OF THE INVENTION

The present invention has particularly for its object to overcome these drawbacks and to provide a cover with a filter which will be of simple design.

According to the invention, the recess has an opening which opens laterally of the cover, and the filter is retractably mounted in a sealed manner through said opening.

Thus, the fact of providing a recess opening laterally of the cover, and no longer into the upper wall of the cover, permits guaranteeing a good appearance of the cover whilst overcoming the problems of trap-recess assembly. These advantages are particularly important when the cover is made of a less costly plastic material such as polypropylene.

Moreover, in known covers provided with filters and during cooking by frying, these filters are rapidly impregnated and saturated with tarry residues which render extremely delicate their extraction from the recess.

According to another important characteristic of the invention, the filter is deposed in a drawer slidably mounted in the recess and comprises a gripping means of which one region is adapted to close the opening of said recess.

Thus, thanks to this drawer, the emplacement or extraction of the filter, which will be in the form of a cartridge or loose material, poses no problem for the user, and guarantees a certain cleanliness.

BRIEF DESCRIPTION OF THE DRAWINGS

The characteristics and advantages of the invention will become apparent from the description which follows, given by way of non-limiting example, with reference to the accompanying drawings, in which:

FIG. 1 is a schematic transverse cross-sectional view of a cover provided with a filter according to the invention;

FIG. 2 is a modified embodiment of the cover according to the invention seen in partial perspective illustrating a drawer for supporting a filter in retracted position;

FIG. 3 is a view similar to FIG. 2, but with the drawer in the extraction position.

DESCRIPTION OF THE PREFERRED EMBODIMENT

In all the mentioned figures, common elements performing common functions are designated by the same reference numerals.

In the embodiment shown in FIG. 1, the cover shown at 1 comprises an upper wall 2 which is made of a plastic material such as polypropylene and whose peripheral edge 3 carries a downwardly extending lateral skirt 4. This cover could also be made of a stamped metallic member. The cover also comprises a lower wall 5, preferably made of metal, fixed at a distance from the upper wall 2 and thereby delimiting a practically closed space 6. This lower wall 5 has steam inlet openings 7, whilst the upper wall 2 has escape openings 8 communicating with the exterior. In a manner known per se, the lower wall 5 carries a sealing joint adapted to be applied in operation against the edge of the bowl receiving food to be cooked of a cooking apparatus which can for example be a rice cooker, a fryer or a multi-cooker.

In the closed space 6 is provided a recess 9 suitable to recess a filter 10 adapted to absorb odors and greases emitted in the course of cooking.

According to the invention, the recess 9 has an opening 12 opening laterally of the cover 1, and the filter 10 is mounted retractably in a sealed manner through said opening 12.

In a first embodiment as shown in FIG. 1, the opening 12 is provided in the skirt 4 and opens directly outside the cover.

In a second embodiment as shown in FIGS. 2 and 3, the opening 12 opens laterally into a depression 14 formed jointly in the lateral skirt 4 and in the upper wall 2.

So as to seal the recess 9, the invention provides closing the opening 12 by a sealing means 13 which can for example be a plug (not shown) of a shape complementary to that of the opening. There will later be described another sealing means which would be more appropriate to the embodiments described.

The filter 10 could be constituted for example by a cartridge with a rigid casing or a filtering fabric containing grains of active carbon, or by filtering layers loaded with active carbon, or else even by one or more perforated metallic sheets superposed and forming baffles.

According to an important feature of the invention, the filter 10 is disposed in a drawer 18 slidably mounted in the recess 9 and comprising a gripping means 20 of which one region 22 is adapted to form a sealing means 13 and to close the opening 12 in a sealed manner. In the embodiment shown in FIG. 1, the drawer 18 is slidably mounted on the lower wall 15 and has the general shape of a parallelepipedal rectangular whose two large lateral sides (not visible) slide respectively on two ribs 25 secured to the cover. The bottom 26 of the drawer has passages 27 letting the steam pass from the inlet openings 7, whilst its outlet 28 lets the steam pass toward the escape openings 8 after having passed through the filter.

To ensure good sealing of the drawer 18 in the recess 9, there can be provided, by way of example, a sealing joint 29 between the upper edge 30 of the drawer and the internal wall 31 of the recess which is now the internal surface of the cover.

Concerning this drawing, the gripping means 20 is formed by a handle secured to a small side 32 of the parallelepipedal and whose shape matches the general shape of the cover so as to render more aesthetically pleasing the cover provided with its filter.

In the embodiment shown in FIGS. 2 and 3, the drawer 18 is formed by a frame 33 comprising a projection forming the gripping means 20 and internal peripheral flange 34 adapted to receive a cage 35 having cross-members 36 so as to constitute the framework for a compartmented filter 10 with active carbon for example and of which the bottom 37 schematically and partially shown in FIG. 3 can be provided with an inert screen or grill. Thus, this cage 35 can be easily replaced and the loading and unloading operations of the drawer are rendered clean and convenient.

As is better seen in FIG. 3, the projection has a shape complementary to the depression 14 of the cover and its front portion 38 is adapted to constitute the sealing means 13 and thus forms a plug for the opening 12 or of the recess 9.

Thanks to the invention, to withdraw or introduce a filter into the cover and more precisely into the recess 9, the user, by means of the gripping portion 20, causes the drawer 18 to slide through the opening 12 and brings it either to the withdrawn position shown in the retracted positions of FIGS. 1 and 2 in which the sealing of the recess 9 is automatically ensured, or into the extended position of FIG. 3.

Once the drawer is withdrawn, the user, as a function of the filter 10 that is used, can either remove this filter by gripping it, or convert the drawer 18 above a garbage can into which the filter falls.

What is claimed is:

1. Cover for a bowl of a cooking apparatus having an upper wall (2) and a lateral skirt (4), a recess (9) adapted to receive a filter (10) for absorbing odors and greases emitted in the course of cooking, and having inlet openings (7) as well as escape openings (8) communicating with the exterior, characterized in that the recess (9) has an opening (12) that opens through the lateral skirt (4) of the cover and through which is retractably mounted the filter (10), sealing means (13) being provided to seal the recess (3) when the filter (10) is disposed in said recess.

2. Cover according to claim 1, characterized in that the opening (12) is provided in the lateral skirt (4) of the cover and opens directly to the exterior of the cover.

3. Cover according to claim 1, characterized in that the opening (12) opens into a depression (14) that spans said skirt and the upper wall (2) of the cover.

4. Cover according to claim 2, characterized in that the opening (12) is closed by a sealing means (13) of a shape complementary to that of said opening.

5. Cover according to claim 4, characterized in that the filter (10) is disposed in a drawer (18) slidably mounted in the recess (9) and comprising a gripping means (20) of which one region (22) is adapted to form the sealing means (13).

6. Cover according to claim 5, characterized in that the drawer (18) has the general shape of a right parallelepiped whose two large lateral sides slide respectively on two ribs (25) secured to the cover and whose bottom (26) has passages (27) for steam.

7. Cover according to claim 6, characterized in that the filter is formed by a cartridge with a rigid casing or a filtering fabric containing active carbon.

8. Cover according to claim 5, characterized in that the drawer (18) is formed by a frame (33) comprising a projection forming the gripping means (20) and an internal flange (34) adapted to receive a cage (35).

9. Cover according to claim 8, characterized in that the cage (35) constitutes a framework for a compartmented filter (10) with active carbon and comprises a bottom (37) comprised by a screen.

10. Cover according to claim 1, characterized in that the upper wall is made of a plastic material.

11. Cover according to claim 3, characterized in that the opening (12) is closed by a sealing means (13) of a shape complementary to that of said opening.

12. A cooking vessel cover, comprising:

an upper wall having a peripheral edge;

a downwardly extending lateral skirt joined to the upper wall at the peripheral edge of the upper wall;

a recess adapted to receive a filter, the recess having an opening in the lateral skirt; and a filter retractably mounted through the opening.

* * * * *

UNITED STATES PATENT AND TRADEMARK OFFICE
CERTIFICATE OF CORRECTION

PATENT NO. : 6,334,888 B1
DATED : January 1, 2002
INVENTOR(S) : Guy Collas and Jean Lereverend It is certified that error appears in the above-identified patent and that said Letters Patent is hereby corrected as shown below:

<u>Title page,</u>
Item [73], change the name of the assignee from "Laboratoires Serobiologiques (Societe Anonyme), Pulnoy (FR)" to -- Moulinex S.A., Paris, France --.

Signed and Sealed this

Eleventh Day of June, 2002

Attest:

Attesting Officer

JAMES E. ROGAN
*Director of the United States Patent and Trademark Office*